US012128298B2

(12) United States Patent
Chen (10) Patent No.: US 12,128,298 B2
(45) Date of Patent: Oct. 29, 2024

(54) METHOD AND APPARATUS FOR PRE-STARTING CLOUD APPLICATION, DEVICE, STORAGE MEDIUM, AND PROGRAM PRODUCT (71) Applicant: Beijing Baidu Netcom Science Technology Co., Ltd., Beijing (CN)

(72) Inventor: Xiangdong Chen, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 268 days.

(21) Appl. No.: 17/868,121

(22) Filed: Jul. 19, 2022

(65) Prior Publication Data

US 2022/0347566 A1 Nov. 3, 2022

(30) Foreign Application Priority Data

Sep. 10, 2021 (CN) .......................... 202111059788.X (51) Int. Cl.
A63F 13/352 (2014.01)
A63F 13/355 (2014.01)
A63F 13/48 (2014.01)

(52) U.S. Cl.
CPC .......... A63F 13/352 (2014.09); A63F 13/355 (2014.09); A63F 13/48 (2014.09)

(58) Field of Classification Search
CPC ....... A63F 13/352; A63F 13/355; A63F 13/48
See application file for complete search history.

(56) References Cited

U.S. PATENT DOCUMENTS

2004/0030882 A1 2/2004 Forman
2015/0297991 A1 10/2015 Mahlmeister et al.
2019/0166023 A1 5/2019 Hutchison et al.

FOREIGN PATENT DOCUMENTS

| CN | 107659649 A | 2/2018 |
|---|---|---|
| CN | 108628645 A | 10/2018 |
| CN | 109582234 A | 4/2019 |
| CN | 109660658 A | 4/2019 |
| CN | 110673948 A | 1/2020 |
| CN | 111214828 A | 6/2020 |
| CN | 111522597 A | 8/2020 |
| CN | 111932246 A | 11/2020 |
| CN | 112104622 A | 12/2020 |
| CN | 112494934 A | 3/2021 |
| CN | 112540773 A | 3/2021 |
| CN | 112619129 A | 4/2021 |
| CN | 112835636 A | 5/2021 |
| CN | 112911013 A | 6/2021 |
| EP | 3 611 615 A1 | 2/2020 |
| WO | 2018/077079 A1 | 5/2018 |

Primary Examiner — Reginald A Renwick
(74) Attorney, Agent, or Firm — Seed IP Law Group LLP (57) ABSTRACT A method and apparatus for pre-starting a cloud application, a device, a storage medium, and a program product are provided. The method includes: installing a cloud application; in response to determining that the cloud application is provided with a pre-starting switch, pre-starting the cloud application, and rendering a running screen of the cloud application; and sending, in response to receiving a startup instruction of the cloud application sent by a user, the running screen to the user. This implementation provides more cloud application scenarios.

20 Claims, 3 Drawing Sheets

METHOD AND APPARATUS FOR PRE-STARTING CLOUD APPLICATION, DEVICE, STORAGE MEDIUM, AND PROGRAM PRODUCT

CROSS-REFERENCE TO RELATED APPLICATIONS

The present application claims the priority of Chinese Patent Application No. 202111059788.X, titled "METHOD AND APPARATUS FOR PRE-STARTING CLOUD APPLICATION, DEVICE, STORAGE MEDIUM, AND PROGRAM PRODUCT", filed on Sep. 10, 2021, the content of which is incorporated herein by reference in its entirety.

TECHNICAL FIELD

The present disclosure relates to the field of cloud computing, particularly relates to a method and apparatus for pre-starting a cloud application, a device, a storage medium, and a program product, which may be applied to cloud platforms, cloud mobile phones, and cloud game scenarios.

BACKGROUND

A cloud game is server-based, such that the game runs directly on a server, and game data is transmitted to a terminal via a network. The game can be played smoothly without a terminal with powerful hardware. Because an age feature of a game user tends to be younger, a game platform, such as the cloud game, that saves money, time, and space, is favored by many game players. However, a single click-to-play function of the game cannot meet requirements for user experience optimization.

SUMMARY

Embodiments of the present disclosure present a method and apparatus for pre-starting a cloud application, a device, a storage medium, and a program product.

In some embodiments of the present disclosure, an embodiment of the present disclosure presents a method for pre-starting a cloud application, including: installing a cloud application; in response to determining that the cloud application is provided with a pre-starting switch, pre-starting the cloud application, and rendering a running screen of the cloud application; and sending, in response to receiving a startup instruction of the cloud application sent by a user, the running screen to the user.

In some embodiments of the present disclosure, an embodiment of the present disclosure presents an apparatus for pre-starting a cloud application, including: an installing module configured to install the cloud application; a pre-starting module configured to, in response to determining that the cloud application is provided with a pre-starting switch, pre-start the cloud application and render a running screen of the cloud application; and a starting module configured to send, in response to receiving a startup instruction of the cloud application sent by a user, the running screen to the user.

In some embodiments of the present disclosure, an embodiment of the present disclosure presents an electronic device, including: at least one processor; and a memory communicatively connected to the at least one processor; where the memory stores instructions executable by the at least one processor, and the instructions are executed by the at least one processor, such that the at least one processor can execute the method according to any one implementation in the first aspect.

In some embodiments of the present disclosure, an embodiment of the present disclosure presents a non-transitory computer readable storage medium storing computer instructions, where the computer instructions are used for causing a computer to execute the method according to any one implementation in the first aspect.

In some embodiments of the present disclosure, an embodiment of the present disclosure presents a computer program product, including a computer program, where the computer program, when executed by a processor, implements the method according to any one implementation in the first aspect.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments with reference to the following accompanying drawings, other features, objectives and advantages of the present disclosure will become more apparent. The accompanying drawings are used for better understanding of the present solution, and do not impose any limitation on the present disclosure. In the accompanying drawings.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications may be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be mutually combined on a non-conflict basis. The present disclosure will be described in detail below with reference to the accompanying drawings and in combination with the embodiments.

Figure 1:
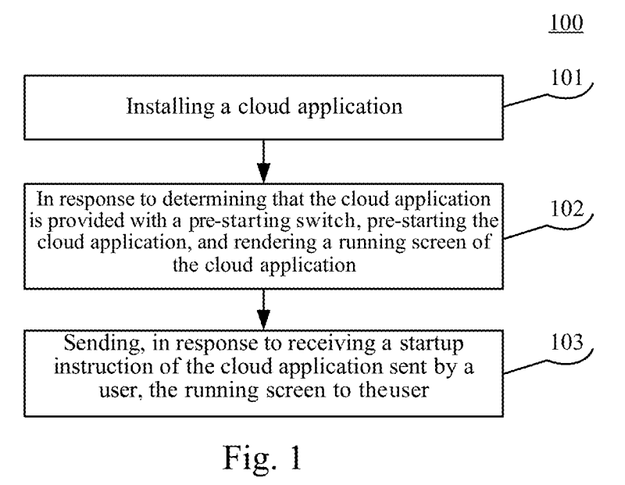
FIG. 1 is a flowchart of a method for pre-starting a cloud application according to a first embodiment of the present disclosure.

FIG. 1 shows a process 100 of a method for pre-starting a cloud application according to a first embodiment of the present disclosure. The method for pre-starting a cloud application includes the following steps.

Step 101: installing a cloud application.

In the present embodiment, an executing body of the method for pre-starting a cloud application may install the cloud application. Generally, after purchasing the cloud application, an operator may install the cloud application on a cloud device. The cloud application is an application capable of running in cloud, such as a cloud game. The cloud device may be a cloud server.

Step 102: in response to determining that the cloud application is provided with a pre-starting switch, pre-starting the cloud application, and rendering a running screen of the cloud application.

In the present embodiment, the cloud application platform may establish an application pre-starting scenario. The cloud application that supports the application pre-starting scenario is provided with the pre-starting switch. The executing body may, in response to determining that the cloud application is provided with the pre-starting switch, pre-start the cloud application and render the running screen of the cloud application. That is to say, the cloud application is pre-started before a user starts the cloud application, to pre-render the running screen of the cloud application.

In some optional implementations of the present embodiment, when pre-starting the cloud application, the executing body may further specify a cloud device capable of running the cloud application. For example, the executing body may specify the cloud device capable of running the cloud application by specifying a device tag. The specified cloud device capable of running the cloud application is a cloud device with which a user is directly connected when the user starts the cloud application, thereby quickly connecting to the cloud device. Generally, after purchasing the cloud application, the operator will attach different tags to cloud device instances. A cloud device carrying a tag corresponding to the cloud application may be specified as the cloud device capable of running the cloud application. For example, after purchasing a cloud game, the operator may attach a specific tag for the cloud game to a batch of cloud devices. As such, the batch of cloud devices is only used for this cloud game. The specific tag for the cloud game may be, for example, a combination of initials of the name of the cloud game.

Step 103: sending, in response to receiving a startup instruction of the cloud application sent by a user, the running screen to the user.

In the present embodiment, in response to receiving the startup instruction of the cloud application sent by the user, the executing body may send the running screen of the cloud application to the user. That is to say, the cloud application is pre-started before the user starts the cloud application, to pre-render the running screen of the cloud application. When attempting to run the cloud application by the user, a startup loading screen of the cloud application will not be presented, and the user may directly start to run the cloud application, thereby improving the user experience.

A trial-run scenario of the cloud application is a scenario in which traffic is monetized for a cloud application manufacturer. In the trial-run scenario of the cloud application, the cloud application is required to be pre-started without queuing. Generally, a push message of the cloud application may be embedded in other applications, for example, in related searches in a lower part on a search page of a search application. The user clicks the push message of the cloud application to enter the trial-run scenario of the cloud application. The push message of the cloud application is generally injected into a quick trial-run application that does not require the user to log in or with a trial-run account being packaged into a quick trial-run application of an application platform, thereby contributing to pre-starting the cloud application.

In the method and apparatus for pre-starting a cloud application, the device, the storage medium, and the program product provided in the embodiments of the present disclosure, the cloud application is installed; the cloud application is pre-started in response to determining that the cloud application is provided with a pre-starting switch, a running screen of the cloud application is rendered; and in response to receiving a startup instruction of the cloud application sent by a user, the running screen is sent to the user, thereby providing more cloud application scenarios. When attempting to run the cloud application by the user, the startup loading screen of the cloud application will not be presented, and the user may directly start to run the cloud application, thereby improving the user experience.

Figure 2:
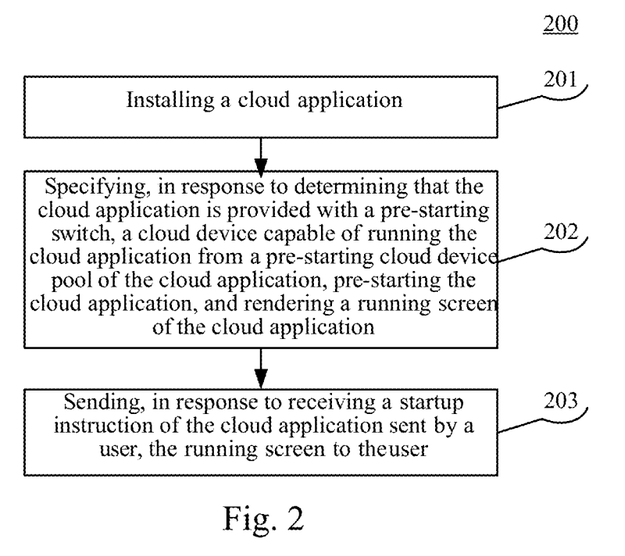
FIG. 2 is a flowchart of the method for pre-starting a cloud application according to a second embodiment of the present disclosure.

Further referring to FIG. 2, a process 200 of the method for pre-starting a cloud application according to a second embodiment of the present disclosure is shown. The method for pre-starting a cloud application includes the following steps.

Step 201: installing a cloud application.

In the present embodiment, specific operations in step 201 have been introduced in detail in step 101 in the embodiment shown in FIG. 1, and will not be repeated here.

Step 202: specifying, in response to determining that the cloud application is provided with a pre-starting switch, a cloud device capable of running the cloud application from a pre-starting cloud device pool for the cloud application, pre-starting the cloud application, and rendering a running screen of the cloud application.

In the present embodiment, the cloud application platform may establish an application pre-starting scenario. The cloud application that supports the application pre-starting scenario is provided with the pre-starting switch. In response to determining that the cloud application is provided with the pre-starting switch, an executing body of the method for pre-starting a cloud application may specify the cloud device capable of running the cloud application from the pre-starting cloud device pool for the cloud application, pre-start the cloud application, and render the running screen of the cloud application.

Generally, when pre-starting the cloud application, the executing body may further specify the cloud device capable of running the cloud application. A flexible instance allocation strategy may be used to improve a utilization of the cloud device as much as possible. This strategy adopts a device pooling capability. The device pooling capability refers to unified management of cloud devices in the pre-starting cloud device pool. Specifically, when the number of cloud devices in the pre-starting cloud device pool is greater than an alarm value and less than an initial value, the executing body may specify the cloud device capable of running the cloud application directly from the pre-starting cloud device pool. When the number of devices in the pre-starting cloud device pool is less than or equal to the alarm value, the executing body may expand the pre-starting cloud device pool by adding devices and specify the cloud device capable of running the cloud application from the expanded pre-starting cloud device pool, thereby guaranteeing smooth pre-start of the cloud application. The executing body may expand the pre-starting cloud device pool by using a product of the initial value multiplied by an expansion ratio as the number of expanded cloud devices. A main cloud device pool may include all cloud devices. A cloud application device pool may include a cloud device performing trial-run of the cloud application. A flexible instance allocation strategy includes four related configurations: the initial value, a maximum threshold, the expansion ratio, and a threshold ratio. The initial value may be a number of initial specified cloud devices capable of running the cloud application. The maximum threshold may be used for defining the maximum number of cloud devices that can be used for performing trial-run of the cloud application. The expansion ratio may be used in expanding the number of trial run cloud applications during a flexible expansion based on the product of the initial value multiplied by the expansion ratio. The threshold ratio may be used in expansion when the number of cloud devices is lower than a product of the initial value multiplied by the expansion ratio.

Step 203: sending, in response to receiving a startup instruction of the cloud application sent by a user, the running screen to the user.

In the present embodiment, specific operations in step 203 have been introduced in detail in step 103 in the embodiment shown in FIG. 1, which will not be repeated here.

A queuing strategy is a waiting strategy in which the user cannot immediately acquire the cloud device capable of running the cloud application. The queuing strategy may provide optimized user experience services for cloud application users. Specifically, after receiving the startup instruction, the executing body may calculate a waiting duration and wait in line based on the waiting duration in a case of determining that no cloud device is capable of running the cloud application. The waiting duration may be equal to a quotient of dividing a product of a trial-run duration of the cloud application multiplied by a queue appearance by 60. The trial-run duration of the cloud application may be provided by a cloud application manufacturer or may be obtained by performing statistics on dotting within the trial run duration of the platform.

Of course, the user may shorten the waiting duration by a specific approach, to improve the user experience. For example, if the user is in a preset list, the waiting duration may be shortened for the user. Usually, after purchasing a platform membership, the user in the preset list may be given a priority for participating in the queuing. For another example, if a user watches a preset push message, the waiting duration may be shortened for the user. If the user watches the push message for 15 seconds, the queue ranking of the user may be advanced by 10.

As can be seen from FIG. 2, compared with the corresponding embodiment of FIG. 1, the process 200 of the method for pre-starting a cloud application in the present embodiment additionally provides a step of specifying a cloud device capable of running the cloud application in accordance with a flexible instance allocation strategy. Therefore, the solution according to the present embodiment specifies the cloud device capable of running the cloud application in accordance with the flexible instance allocation strategy, thereby improving the utilization of the cloud device as much as possible.

Figure 3:
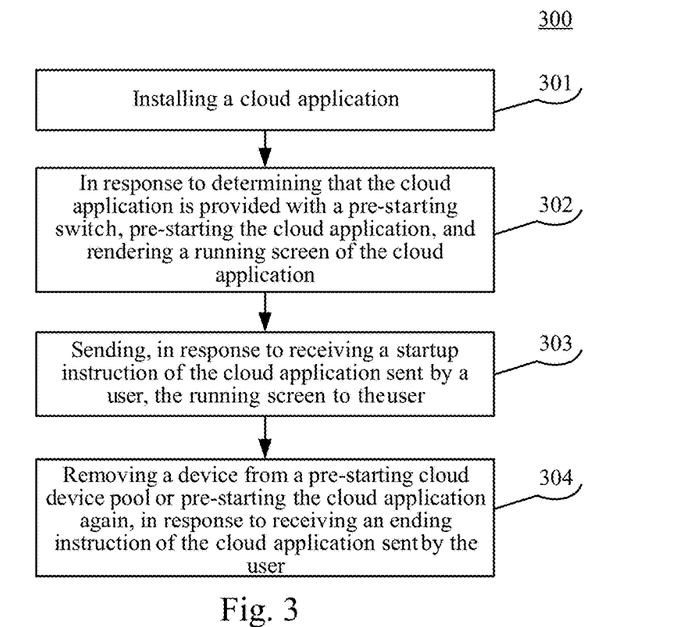
FIG. 3 is a flowchart of a method for pre-starting a cloud application according to a third embodiment of the present disclosure.

Further referring to FIG. 3, a process 300 of the method for pre-starting a cloud application according to a third embodiment of the present disclosure is shown. The method for pre-starting a cloud application includes the following steps.

Step 301: installing a cloud application.

Step 302: in response to determining that the cloud application is provided with a pre-starting switch, pre-starting the cloud application, and rendering a running screen of the cloud application.

Step 303: sending, in response to receiving a startup instruction of the cloud application sent by a user, the running screen to the user.

In the present embodiment, specific operations of steps 301 to 303 have been introduced in detail in steps 101 to 103 in the embodiment shown in FIG. 1, which will not be repeated here.

Step 304: removing a device from a pre-starting cloud device pool or pre-starting the cloud application again, in response to receiving an ending instruction of the cloud application sent by the user.

In the present embodiment, when receiving an ending instruction of the cloud application sent by the user, an executing body of the method for pre-starting a cloud application may remove a device from the pre-starting cloud device pool or pre-start the cloud application again. The removing a device from the pre-starting cloud device pool can avoid idling resources. The user may, when restarting the cloud application, quickly enter the cloud application by pre-starting the cloud application again, thereby improving the user experience.

As can be seen from FIG. 3, compared with the corresponding embodiment of FIG. 1, the process 300 of the method for pre-starting a cloud application in the present embodiment additionally provides a step of ending the cloud application. Hence, after ending the cloud application, the solution according to the present embodiment removes a device from the pre-starting cloud device pool, thereby avoiding idling resources. After ending the cloud application, the user may, when restarting the cloud application, quickly enter the cloud application by pre-starting the cloud application again, thereby improving the user experience.

Here, a single click-to-run function of the cloud application obviously cannot meet the requirements of cloud application service providers for traffic monetization, cloud device utilization maximization, and user experience optimization. Therefore, it is further necessary to continuously increase cloud application scenarios. The construction of the cloud application platform not only involves the click-to-run scenario of the cloud application, but also involves the construction of various scenarios, such as cloud application pre-starting, device allocation strategy, device pooling capability, and queuing strategy, thus providing more cloud application scenarios. The services in all of the above scenarios of cloud applications may be implemented by packaging into a SaaS (Software-as-a-Service) service for external sales, which is different from a PaaS (Platform-as-a-Service) service of commercially available cloud mobile phones provided by most cloud mobile phone manufacturers. PaaS is more often used in selling cloud mobile phone devices, while platforms such as cloud application scenarios are more often used in selling cloud application services, thus providing a SaaS service function for the cloud application. The SaaS services are closer in use by users, and the cloud application platform further encapsulates a layer of SaaS services specific to cloud applications on the top of cloud device services.

Figure 4:
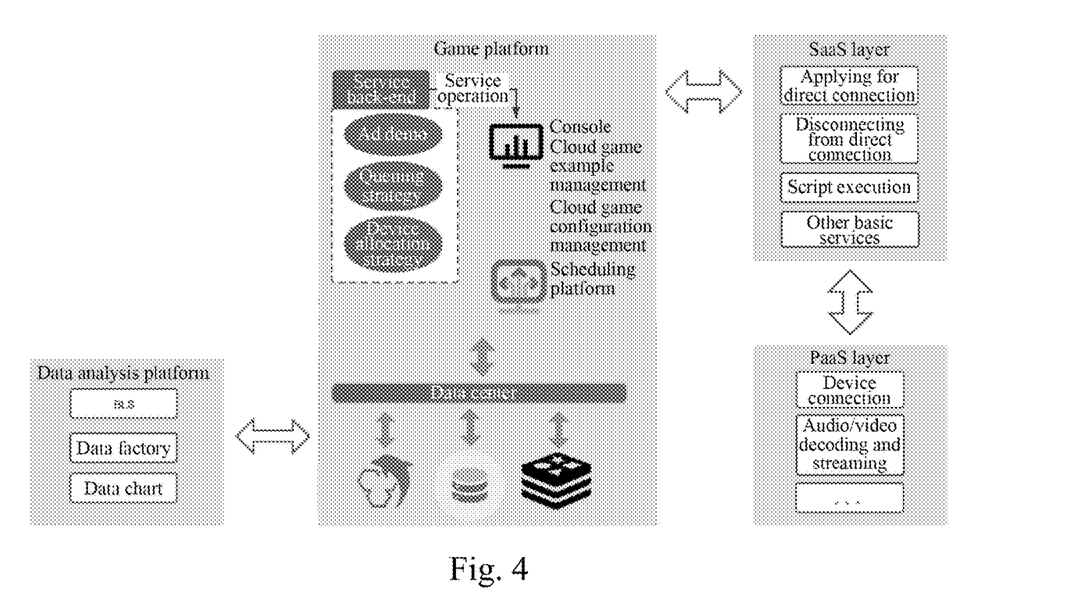
FIG. 4 is a structural diagram of a cloud game application platform.

For ease of understanding, by taking a cloud game as an example of the cloud application, FIG. 4 shows a structural diagram of a cloud game application platform. As shown in FIG. 4, the cloud game application platform mainly needs to implement two modules: a game platform and a data analysis platform. At present, a cloud mobile phone service may be selected to complete a SaaS layer and a PaaS layer. The game platform not only includes construction of a click-to-play scenario, but also includes the construction of various scenarios, such as click-to-play advertising, pre-starting, a device allocation strategy, a device pooling capability, and a queuing strategy. A service platform provides openapi interfaces for the above scenarios. A console is used in cloud game-specific configuration management and cloud mobile device management. A scheduling platform is a platform for executing timed tasks, such as a timed task of pre-starting a cloud game. The data analysis platform is implemented by invoking a dotting interface via a client and analyzing a BLS log, and reports user behavior and a game page by dotting, to analyze the user behavior, form a conversion funnel, and provide the user with an optimization solution.

Figure 5:
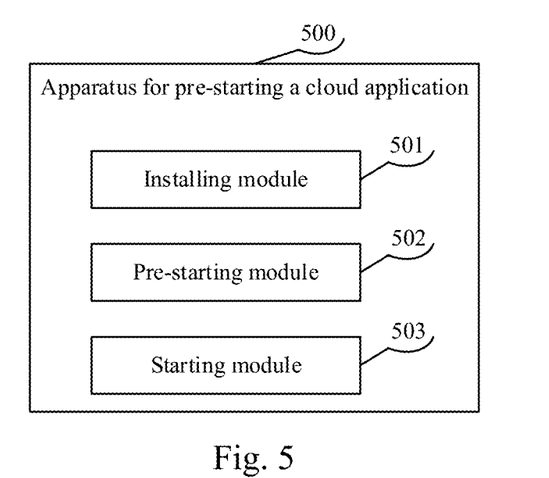
FIG. 5 is a schematic structural diagram of an apparatus for pre-starting a cloud application according to an embodiment of the present disclosure.

Further referring to FIG. 5, as an implementation of the method shown in the above figures, an embodiment of the present disclosure provides an apparatus for pre-starting a cloud application. The embodiment of the apparatus corresponds to the embodiment of the method shown in FIG. 1, and the apparatus may be specifically applied to various electronic devices.

As shown in FIG. 5, the apparatus 500 for pre-starting a cloud application of the present embodiment may include: an installing module 501, a pre-starting module 502, and a starting module 503. The installing module 501 is configured to install the cloud application; the pre-starting module 502 is configured to, in response to determining that the cloud application is provided with a pre-starting switch, pre-start the cloud application and render a running screen of the cloud application; and the starting module 503 is configured to send, in response to receiving a startup instruction of the cloud application sent by a user, the running screen to the user.

The related description of steps 101 to 103 in the corresponding embodiment of FIG. 1 may be referred to for specific processing of the installing module 501, the pre-starting module 502, and the starting module 503 of the apparatus 500 for pre-starting a cloud application in the present embodiment and the technical effects thereof, respectively. The description will not be repeated here.

In some optional implementations of the present embodiment, the apparatus 500 for pre-starting a cloud application may further include: a specifying module configured to specify a cloud device capable of running the cloud application.

In some optional implementations of the present embodiment, the specifying module includes: a first specifying submodule configured to specify a cloud device carrying a tag corresponding to the cloud application as the cloud device capable of running the cloud application.

In some optional implementations of the present embodiment, the specifying module includes: a second specifying submodule configured to specify the cloud device capable of running the cloud application from a pre-starting cloud device pool of the cloud application.

In some optional implementations of the present embodiment, the second specifying submodule includes: a specifying unit configured to specify, in a case that the number of cloud devices in the pre-starting cloud device pool is greater than an alarm value and less than an initial value, the cloud device capable of running the cloud application directly from the pre-starting cloud device pool, where the initial value is a number of initial specified cloud devices capable of running the cloud application.

In some optional implementations of the present embodiment, the second specifying submodule further includes: an expanding unit configured to expand the pre-starting cloud device pool by adding cloud devices in a case that the number of cloud devices in the pre-starting cloud device pool is less than or equal to the alarm value, and specify the cloud device capable of running the cloud application from the expanded pre-starting cloud device pool.

In some optional implementations of the present embodiment, the expanding unit is further configured to: expand for the pre-starting cloud device pool by taking a product of the initial value multiplied by an expansion ratio as the number of cloud devices in the expanded pre-starting cloud device pool.

In some alternative implementations of the present embodiment, the apparatus 500 for pre-starting a cloud application further includes: a waiting module configured to calculate a waiting duration in response to determining that there is no cloud device capable of running the cloud application after receiving the startup instruction, and wait in line based on the waiting duration.

In some optional implementations of the present embodiment, the apparatus 500 for pre-starting a cloud application further includes: a shortening module configured to shorten the waiting duration of a user in response to determining that the user is in a preset list, or that the user watches a preset push message.

In some alternative implementations of the present embodiment, the apparatus 500 for pre-starting a cloud application further includes: an ending module configured to remove a device from the pre-starting cloud device pool or pre-start the cloud application again in response to receiving an ending instruction of the cloud application sent by the user.

In the technical solution of the present disclosure, the collection, storage, use, processing, transfer, provision, and disclosure of personal information of a user involved are in conformity with relevant laws and regulations, and do not violate public order and good customs.

According to an embodiment of the present disclosure, the present disclosure further provides an electronic device, a readable storage medium, and a computer program product.

Figure 6:
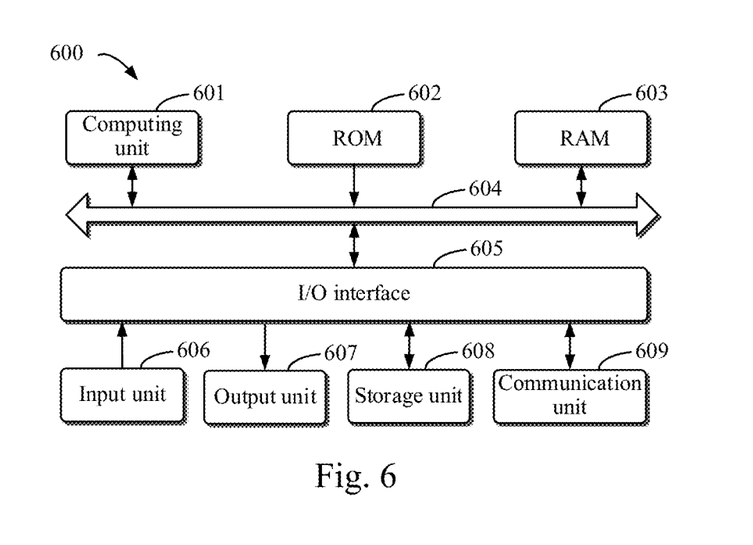
FIG. 6 is a block diagram of an electronic device configured to implement the method for pre-starting a cloud application of embodiments of the present disclosure.

FIG. 6 shows a schematic block diagram of an example electronic device 600 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 6, the device 600 includes a computing unit 601, which may execute various appropriate actions and processes in accordance with a computer program stored in a read-only memory (ROM) 602 or a computer program loaded into a random-access memory (RAM) 603 from a storage unit 608. The RAM 603 may further store various programs and data required by operations of the device 600.

The computing unit 601, the ROM 602, and the RAM 603 are connected to each other through a bus 604. An input/output (I/O) interface 605 is also connected to the bus 604.

A plurality of components in the device 600 is connected to the I/O interface 605, including: an input unit 606, such as a keyboard and a mouse; an output unit 607, such as various types of displays and speakers; a storage unit 608, such as a magnetic disk and an optical disk; and a communication unit 609, such as a network card, a modem, and a wireless communication transceiver. The communication unit 609 allows the device 600 to exchange information/data with other devices via a computer network such as the Internet and/or various telecommunication networks.

The computing unit 601 may be various general-purpose and/or special-purpose processing components having a processing power and a computing power. Some examples of the computing unit 601 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, and the like. The computing unit 601 executes various methods and processes described above, such as the method for pre-starting a cloud application. For example, in some embodiments, the method for pre-starting a cloud application may be implemented as a computer software program that is tangibly included in a machine readable medium, such as the storage unit 608. In some embodiments, some or all of the computer programs may be loaded and/or installed onto the device 600 via the ROM 602 and/or the communication unit 609. When the computer program is loaded into the RAM 603 and executed by the computing unit 601, one or more steps of the method for pre-starting a cloud application described above may be executed. Alternatively, in other embodiments, the computing unit 601 may be configured to execute the method for pre-starting a cloud application by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flowcharts and/or block diagrams to be implemented. The program codes may be completely executed on a machine, partially executed on a machine, executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The computer readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read only memory (EPROM or flash memory), an optical fiber, a portable compact disk read-only memory (CD-ROM), an optical memory device, a magnetic memory device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other. The server may be a cloud server, a distributed system server, or a server combined with a blockchain.

It should be understood that the various forms of processes shown above may be used to reorder, add, or delete steps. For example, the steps disclosed in the present disclosure may be executed in parallel, sequentially, or in different orders, as long as the desired results of the technical solutions provided in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for pre-starting a cloud application, comprising:
    installing the cloud application;
    in response to determining that the cloud application is provided with a pre-starting switch, pre-starting the cloud application, and rendering a running screen of the cloud application; and
    sending, in response to receiving a startup instruction of the cloud application sent by a user, the running screen to the user.

2. The method according to claim 1, wherein in pre-starting the cloud application, the method further comprises:
    specifying a cloud device capable of running the cloud application.

3. The method according to claim 2, wherein specifying the cloud device capable of running the cloud application comprises:
    specifying a cloud device carrying a tag corresponding to the cloud application as the cloud device capable of running the cloud application.

4. The method according to claim 2, wherein specifying the cloud device capable of running the cloud application comprises:
    specifying the cloud device capable of running the cloud application from a pre-starting cloud device pool of the cloud application.

5. The method according to claim 4, wherein specifying the cloud device capable of running the cloud application from the pre-starting cloud device pool of the cloud application comprises:
    specifying, in a case that a number of cloud devices in the pre-starting cloud device pool is greater than an alarm value and less than an initial value, the cloud device capable of running the cloud application directly from the pre-starting cloud device pool, wherein the initial value is a number of initial specified cloud devices capable of running the cloud application.

6. The method according to claim 5, wherein specifying the cloud device capable of running the cloud application from the pre-starting cloud device pool of the cloud application further comprises:
    expanding the pre-starting cloud device pool by adding cloud devices in a case that the number of cloud devices in the pre-starting cloud device pool is less than or equal to the alarm value, and specifying the cloud device capable of running the cloud application from the expanded pre-starting cloud device pool.

7. The method according to claim 6, wherein expanding the pre-starting cloud device pool by adding cloud devices comprises:
    expanding the pre-starting cloud device pool by taking a product of the initial value multiplied by an expansion ratio as the number of cloud devices in the expanded pre-starting cloud device pool.

8. The method according to claim 1, wherein the method further comprises:
    calculating a waiting duration in response to determining that there is no cloud device capable of running the cloud application after receiving the startup instruction, and waiting in line based on the waiting duration.

9. The method according to claim 8, wherein the method further comprises:
    shortening the waiting duration of a user in response to determining that the user is in a preset list, or that the user watches a preset push message.

10. The method according to claim 4, wherein the method further comprises:
    removing a device from the pre-starting cloud device pool or pre-starting the cloud application again in response to receiving an ending instruction of the cloud application sent by the user.

11. An apparatus for pre-starting a cloud application, comprising:
    at least one processor; and
    a memory storing instructions, wherein the instructions when executed by the at least one processor, cause the at least one processor to perform operations, the operations comprising:
    installing the cloud application;
    in response to determining that the cloud application is provided with a pre-starting switch, pre-starting the cloud application and rendering a running screen of the cloud application; and
    sending, in response to receiving a startup instruction of the cloud application sent by a user, the running screen to the user.

12. The apparatus according to claim 11, wherein the operations further comprise:
    specifying a cloud device capable of running the cloud application.

13. The apparatus according to claim 12, wherein the operations further comprise:
    specifying a cloud device carrying a tag corresponding to the cloud application as the cloud device capable of running the cloud application.

14. The apparatus according to claim 12, wherein the operations further comprise:
    specifying the cloud device capable of running the cloud application from a pre-starting cloud device pool of the cloud application.

15. The apparatus according to claim 14, wherein the operations further comprise:
    specifying, in a case that a number of cloud devices in the pre-starting cloud device pool is greater than an alarm value and less than an initial value, the cloud device capable of running the cloud application directly from the pre-starting cloud device pool, wherein the initial value is a number of initial specified cloud devices capable of running the cloud application.

16. The apparatus according to claim 15, wherein the operations further comprise:
    expanding the pre-starting cloud device pool by adding cloud devices in a case that the number of cloud devices in the pre-starting cloud device pool is less than or equal to the alarm value, and specify the cloud device capable of running the cloud application from the expanded pre-starting cloud device pool.

17. The apparatus according to claim 16, wherein the operations further comprise:
    expanding the pre-starting cloud device pool by taking a product of the initial value multiplied by an expansion ratio as the number of cloud devices in the expanded pre-starting cloud device pool.

18. The apparatus according to claim 11, wherein the operations further comprise:
- calculating a waiting duration in response to determining that there is no cloud device capable of running the cloud application after receiving the startup instruction, and waiting in line based on the waiting duration.

19. The apparatus according to claim 18, wherein the operations further comprise:
- shortening the waiting duration of a user in response to determining that the user is in a preset list, or that the user watches a preset push message.

20. A non-transitory computer readable storage medium storing computer instructions, wherein the computer instructions are used for causing a computer to execute operations comprising:
- installing a cloud application;
- in response to determining that the cloud application is provided with a pre-starting switch, pre-starting the cloud application, and rendering a running screen of the cloud application; and
- sending, in response to receiving a startup instruction of the cloud application sent by a user, the running screen to the user.

\* \* \* \* \*